A. C. POORE.
EGG BEATER.
APPLICATION FILED MAR. 26, 1909.

945,983.

Patented Jan. 11, 1910.
2 SHEETS—SHEET 1.

Witnesses
T. S. Austin
M. R. Alford

Inventor
Alfred C. Poore

By Joshua R. H. Potts
Attorney

A. C. POORE.
EGG BEATER.
APPLICATION FILED MAR. 26, 1909.
945,983.
Patented Jan. 11, 1910.
2 SHEETS—SHEET 2.
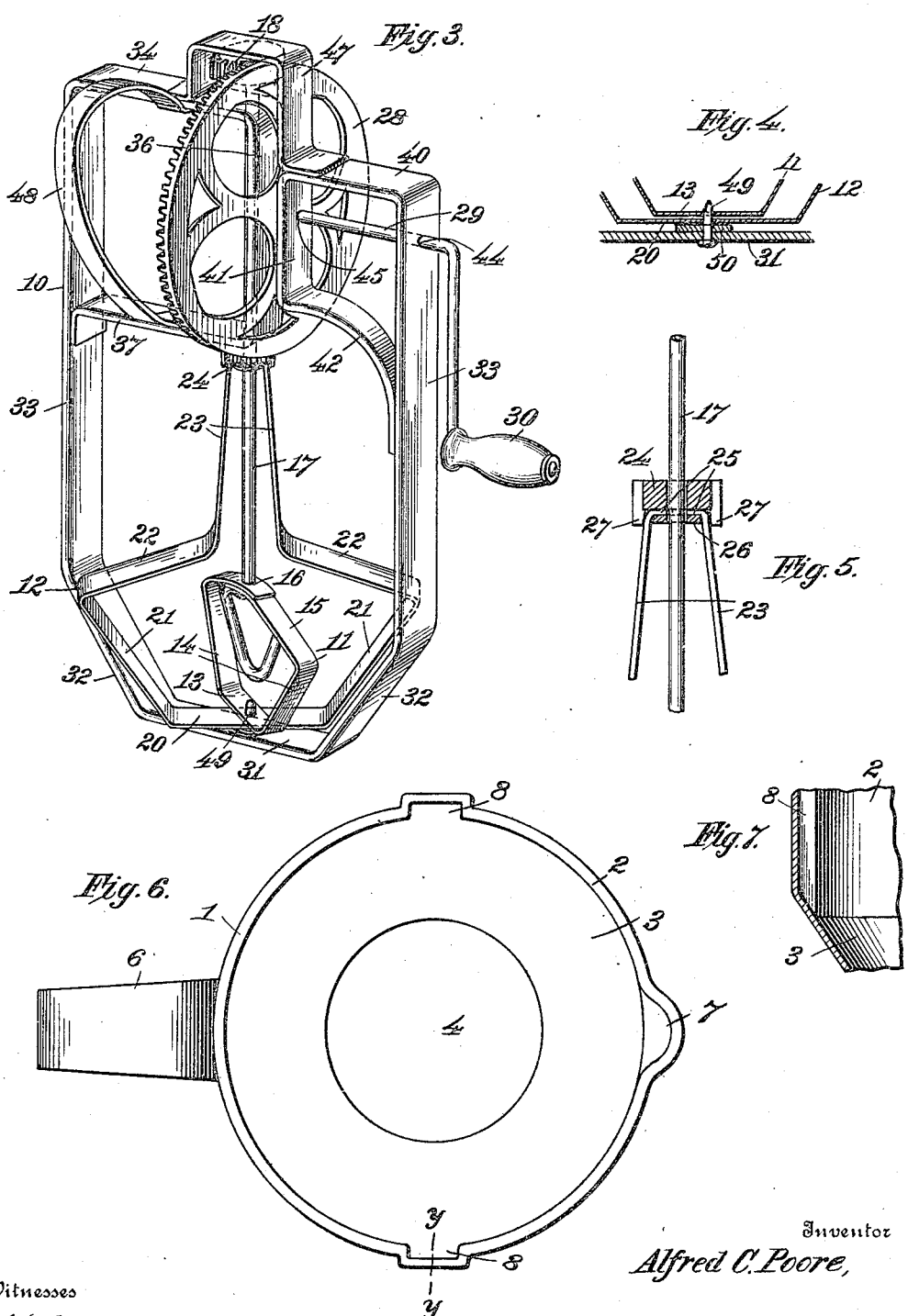
Witnesses
H. S. Austin
M. R. Alford
Inventor
Alfred C. Poore,
By Joshua R. H. Potts
Attorney

UNITED STATES PATENT OFFICE.

ALFRED C. POORE, OF EAST BROWNFIELD, MAINE.

EGG-BEATER.

945,983.

Specification of Letters Patent.

Patented Jan. 11, 1910.

Application filed March 26, 1909. Serial No. 485,989.

*To all whom it may concern:*

Be it known that I, ALFRED C. POORE, a citizen of the United States, residing at East Brownfield, county of Oxford, and State of Maine, have invented certain new and useful Improvements in Egg-Beaters, of which the following is a specification.

My invention relates to egg beaters and the object of my invention is to provide an egg beater of improved construction which shall be simple to operate and of great efficiency.

A further and particular object of my invention is to provide an egg beater comprising a beater proper and a receptacle, the latter being provided with means for holding the former therein and the former being adapted for use either in the said receptacle or in any dish or bowl as desired.

A further object of my invention is to provide a device as mentioned which shall be of simple construction and one which may be readily kept clean.

Other objects will appear hereinafter.

With these objects in view my invention consists generally in a receptacle, in combination with a skeleton frame adapted to fit therein and a beater mounted in said frame, the receptacle being provided with channels in its walls to receive and removably hold portions of said frame.

My invention further consists in an egg beater comprising a frame, a pair of dashers arranged one within the other and adapted to rotate upon the same axis and means for driving said dashers in opposite directions.

My invention further consists in an egg beater comprising a receptacle in combination with a skeleton frame and a beater mounted in said frame, the receptacle being provided with means for removably supporting said frame and beater and said receptacle and said frame each being provided with a handle so arranged that when the beater is within the receptacle the handle shall be adjacent to each other and the handle on said frame serving as means for removing the beater from the receptacle and for holding the same when operating without the receptacle.

My invention further consists in various details of construction and arrangements of parts all as will be fully described hereinafter and particularly pointed out in the claim.

Figure 1:
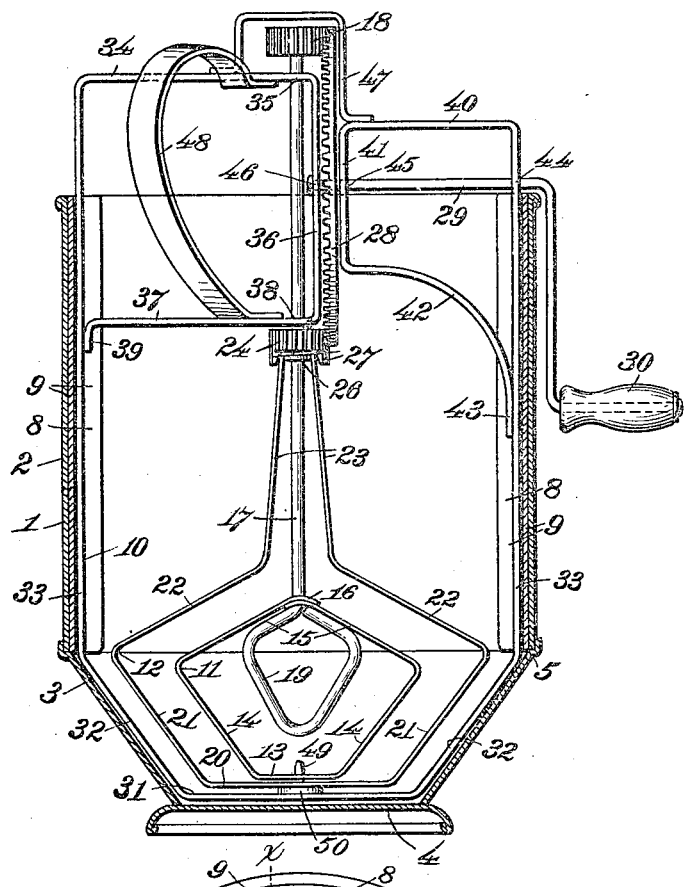
Figure 2:
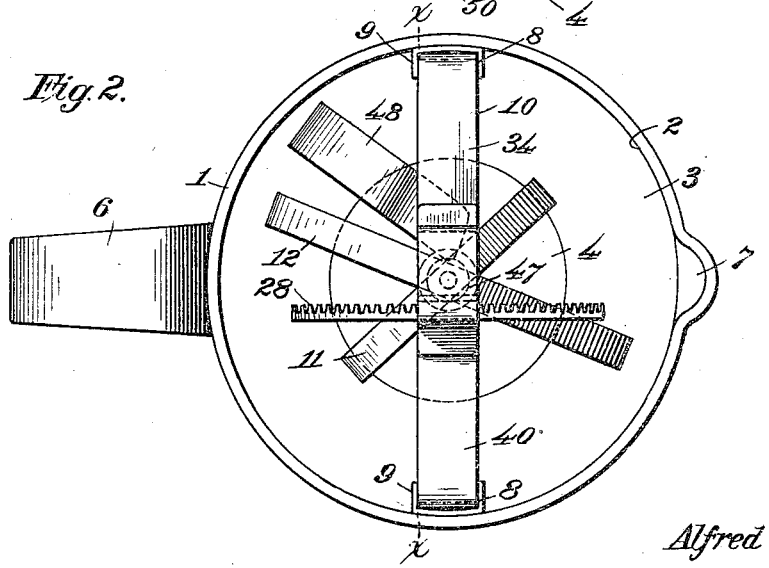

My invention will be more readily understood by reference to the accompanying drawings forming a part of this specification and in which, Figure 1 is a vertical section through the receptacle on substantially the line $x$—$x$ of Fig. 2, illustrating the beater and beater frame in position therein, Fig. 2 is a plan view of the device, Fig. 3 is a perspective view of the beater and beater frame removed from the receptacle, Fig. 4 is a detail sectional view illustrating the pivotal connection between the lower ends of the dashers and the adjacent portion of the frame, Fig. 5 is a detail sectional view illustrating the manner in which the upper end of the outer or larger dasher is rotatably mounted upon the inner or smaller dasher shaft, Fig. 6 is a plan view of a slightly modified form of the receptacle, and Fig. 7 is a detail sectional view of the same on the line $y$—$y$ of Fig. 6.

Referring now to the drawings, 1 indicates the receptacle which may be of substantially any form but preferably comprises a cylindrical body portion 2 terminating at its lower end in an inverted frusto-conical portion 3 and a flat bottom 4. The upper edge of the portion 3 is preferably shouldered as at 5 to receive the lower edge of the cylindrical portion 2, making a close neat joint between the same which shall prevent the accumulation of matter therein. The receptacle 1 is provided with a handle 6 upon one side and a lip 7 on the side diametrically opposite therefrom. Within the receptacle and diametrically opposite from each other are a pair of vertically disposed channels or grooves 8 to receive the frame of the beater as will be fully described hereinafter. The channels or grooves 8 may be formed either of channel members 9 secured to the inner face of the portion 2, or by forming the same in the walls of the receptacle as shown in Figs. 6 and 7. The latter construction is preferable when the portions 2 and 3 are formed integrally, the grooves then being stamped in the side walls as illustrated.

The beater proper comprises a skeleton frame 10, a pair of dashers 11 and 12 and suitable means for driving the same. The dashers are each formed of a single flat strip of metal bent to conform substantially to the shape of the lower portion of the receptacle, and are of two sizes and arranged one within the other. The inner or smaller dasher 11 comprises a horizontal bottom portion 13, upwardly and outwardly inclined sides and upwardly and inwardly inclined top portion 15. As before stated the dasher is made of a single strip of metal and the ends meet and overlap at the center of the top, as at 16 forming a reinforced portion to which the shaft is attached. The inner dasher shaft comprises the rod 17. This is provided at its upper end with a pinion 18 and its lower end extends through the reinforced or overlapped portion 16 of the dasher and then bent into a loop 19 which conforms substantially to the shape of the dasher but considerably smaller in size.

The outer or larger dasher comprises the corresponding bottom, side and top portions 20, 21 and 22 respectively, parallel with the portions 13, 14 and 15. The top portions 22 terminate at their inner ends in upwardly extending arms 23, to the uper ends of which is rigidly secured a pinion 24 and said pinion is loosely mounted on the shaft 17 in order that the dashers may rotate in opposite directions. To rigidly secure the arms 23 to the pinion 24 their upper ends are bent inwardly as at 25, resting against the under face of the pinion as shown in Fig. 5 and to which they are secured as by soldering. Soldered over the ends 25 is a washer or disk 26, and to further insure against the parts becoming detached the adjacent teeth of the pinion are extended downwardly as at 27 to bear against the outer face of the upper ends of the arms, 28 indicates a crown gear mounted upon a horizontal crank shaft 29 and meshing with the pinions 18 and 24, and 30, the crank handle, by means of which the device is operated.

The frame 10 is formed of a single strip of metal bent to conform substantially to the shape of the receptacle 1 and to form bearings for the shafts 17 and 29. To this end it consists of the horizontal bottom portion 31 terminating at its sides in upwardly and outwardly inclined portions 32 and then extending upwardly forming the vertical parallel sides 33 which rest in the grooves or channel 8. The sides 33 are of sufficient length to extend above the upper edge of the receptacle and one side is bent inwardly forming a horizontal portion 34 extending a short distance beyond the central axis forming a bearing 35 for the shaft 17, then bent downwardly as at 36 parallel with the shaft and then outwardly as at 37 to its respective side and forming a lower bearing 38 for said shaft, the end 39 being secured to the side as by soldering. The opposite side 33 is bent inwardly forming a horizontal portion 40 then downwardly as at 41 and then curved outwardly and downwardly as at 42, having its end 43 secured as by soldering to its respective side 33, the side 33 and the portion 41 providing bearings 44 and 45 respectively for the shaft 29, the portion 36 also being provided with a bearing 46 for the same. The portions 36 and 41 are parallel and vertical and are a sufficient distance apart to accommodate the crown gear 28 between them, the pinion 18 being arranged above the portion 34 and the pinion 24 below the portion 37.

47 indicates a yoke or member secured to the portions 34 and 40 and arched over the pinion 18 and gear 28 and serves both as a shield to prevent the fingers or clothing catching between the gears and as a brace to secure the upper ends of the frame and maintain the sides 33 in parallelism.

48 indicates a handle on the frame 10 which comprises a curved strip of metal secured at its upper end to the portion 34 and at its lower end to the portion 37 of the frame. This is preferably arranged obliquely on the frame so that when the handle 6 is grasped the thumb may rest upon the handle and assist in holding the beater and frame firmly within the receptacle. The handle 48 also serves as means for conveniently holding the beater when using the same in conjunction with other receptacles other than that provided for the device.

To prevent displacement of the lower ends of the dasher a pivot pin 49 is provided. This extends upwardly from the portion 31 of the frame through apertures in the portions 20 and 13 of the dashers and a washer 50 is interposed between the frame and the outer dasher portion as shown clearly in Fig. 4.

Having described my invention what I claim as new and desire to secure by Letters Patent is:

In a device of the class described, a receptacle in combination with a frame removably mounted therein, means in said receptacle for holding said frame against rotation, a dasher and dasher operating mechanism in said frame, a handle on said receptacle and a handle on said frame adjacent the first said handle when the frame is in position within the receptacle whereby said handles may be grasped simultaneously with one hand, substantially as described.

In testimony whereof I have signed my name to this specification in the presence of two subscribing witnesses.

ALFRED C. POORE.

Witnesses:
FRED L. POORE,
EMMA A. HILL.